(12) United States Patent
Sung et al.

(10) Patent No.: US 10,476,999 B2
(45) Date of Patent: Nov. 12, 2019

(54) MOBILE TERMINAL

(71) Applicant: LG ELECTRONICS INC., Seoul (KR)

(72) Inventors: Changhoon Sung, Seoul (KR); Jongpil Kim, Seoul (KR); Juha Hyun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/320,992

(22) PCT Filed: Dec. 15, 2016

(86) PCT No.: PCT/KR2016/014691
§ 371 (c)(1),
(2) Date: Jan. 25, 2019

(87) PCT Pub. No.: WO2018/021633
PCT Pub. Date: Feb. 1, 2018

(65) Prior Publication Data
US 2019/0173987 A1 Jun. 6, 2019

(30) Foreign Application Priority Data

Jul. 28, 2016 (KR) .................. 10-2016-0096400

(51) Int. Cl.
*H04M 1/00* (2006.01)
*H04M 1/02* (2006.01)
(Continued)

(52) U.S. Cl.
CPC ............ *H04M 1/0264* (2013.01); *G02B 7/02* (2013.01); *G03B 17/02* (2013.01); *G06F 1/1658* (2013.01);
(Continued)

(58) Field of Classification Search
CPC ........ G08B 13/19613; G08B 13/19628; G06F 21/32; G06K 9/00597; G06K 9/00617
See application file for complete search history.

(56) References Cited

U.S. PATENT DOCUMENTS 9,766,424 B2 * 9/2017 Kim .................... G02B 7/08
2009/0052886 A1 * 2/2009 Watanabe .......... H04N 1/00307
396/486
(Continued)

FOREIGN PATENT DOCUMENTS

KR 10-0673427 B1 1/2007
KR 10-2010-0104556 A 9/2010
(Continued)

OTHER PUBLICATIONS

International Search Report for PCT/KR2016/014691 (PCT/ISA/210) dated Apr. 26, 2017.

*Primary Examiner* — Shantell L Heiber
(74) *Attorney, Agent, or Firm* — Birch, Stewart, Kolasch & Birch, LLP

(57) ABSTRACT

A mobile terminal including a terminal body; and a camera module provided in the terminal body. The camera module includes a lens assembly; an image sensor provided at a lower end of the lens assembly; a first actuator mounted with a first filter and a second filter provided on one side of the lens assembly to filter light incident on the image sensor, wherein the first actuator comprises first and second support walls, and a first plate supported by the first and second support walls and supporting the first and second filters; a filter change device configured to move the first filter to overlap with the lens assembly in a first state and to move the second filter to overlap with the lens assembly in a second state; and a cover constituting an appearance of the camera module and including a through hole corresponding (Continued)

to an optical axis of the camera module, the cover having an inner space accommodating the lens assembly and the first actuator.

20 Claims, 13 Drawing Sheets

(51) Int. Cl.
   *G02B 7/02* (2006.01)
   *G03B 17/02* (2006.01)
   *H04M 1/667* (2006.01)
   *G06F 1/16* (2006.01)
   *G06F 21/32* (2013.01)
   *G06F 21/84* (2013.01)
   *H04N 5/225* (2006.01)

(52) U.S. Cl.
   CPC ............ *G06F 1/1686* (2013.01); *G06F 21/32* (2013.01); *G06F 21/84* (2013.01); *H04M 1/02* (2013.01); *H04M 1/667* (2013.01); *H04N 5/2254* (2013.01); *G06F 2221/2149* (2013.01)

(56) References Cited

U.S. PATENT DOCUMENTS

| | | | |
|---|---|---|---|
| 2016/0173492 A1* | 6/2016 | Han | H04L 63/0861 705/16 |
| 2016/0353004 A1* | 12/2016 | Cheong | H04N 5/2257 |
| 2017/0140221 A1* | 5/2017 | Ollila | G06K 9/00604 |

FOREIGN PATENT DOCUMENTS

| | | |
|---|---|---|
| KR | 10-2012-0087632 A | 8/2012 |
| KR | 10-2016-0044122 A | 4/2016 |
| WO | WO 2010/177105 A1 | 10/2010 |

* cited by examiner

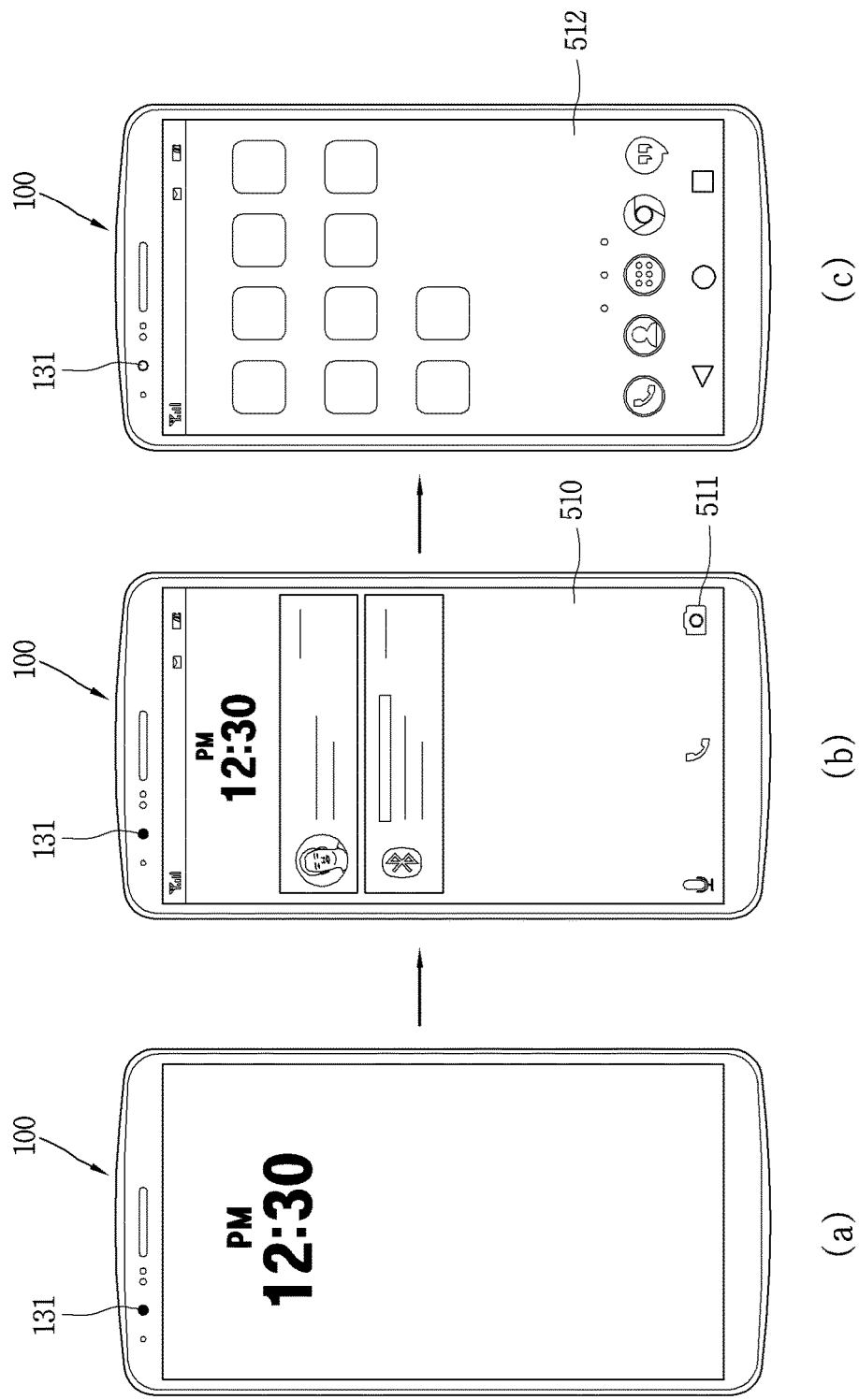

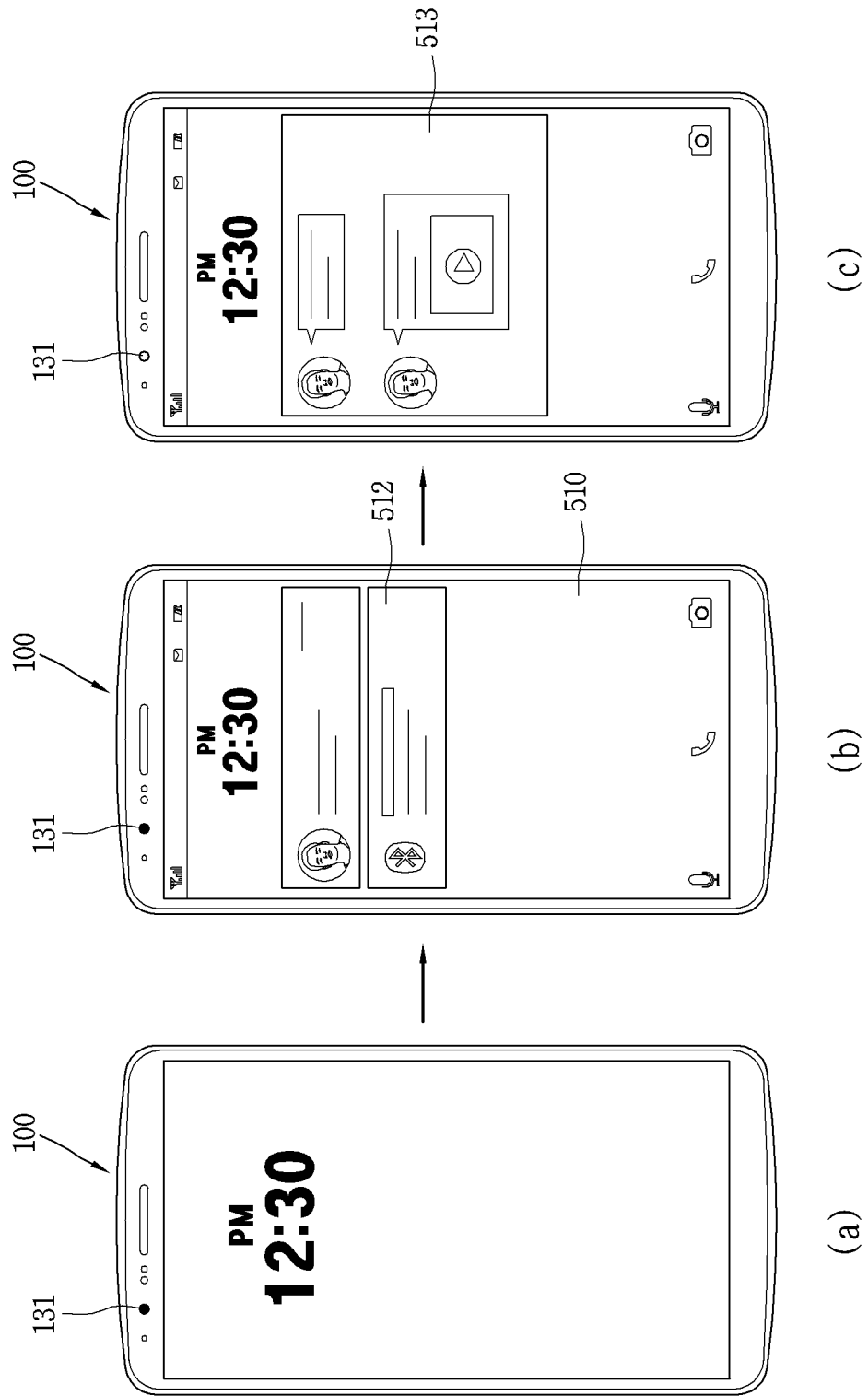

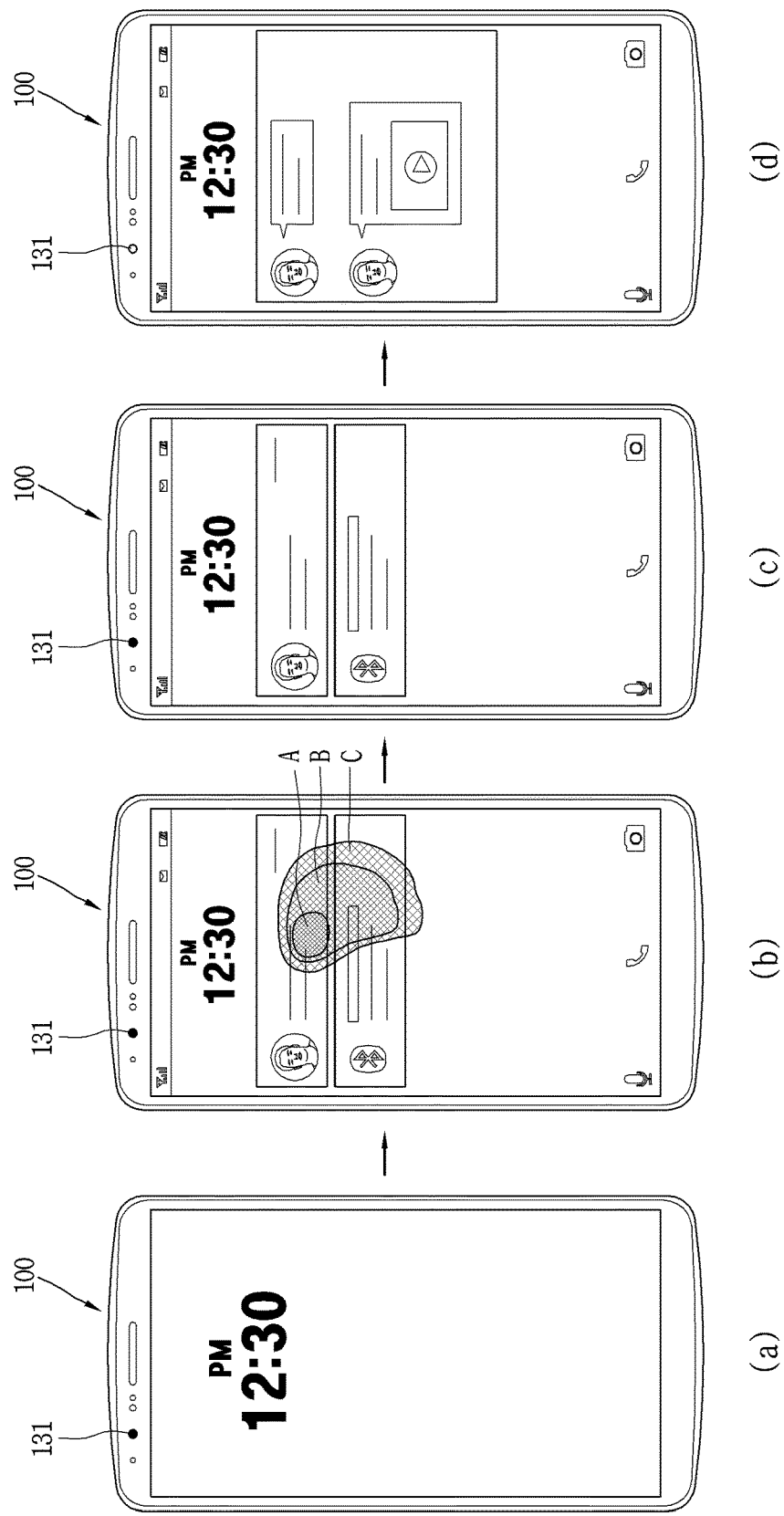

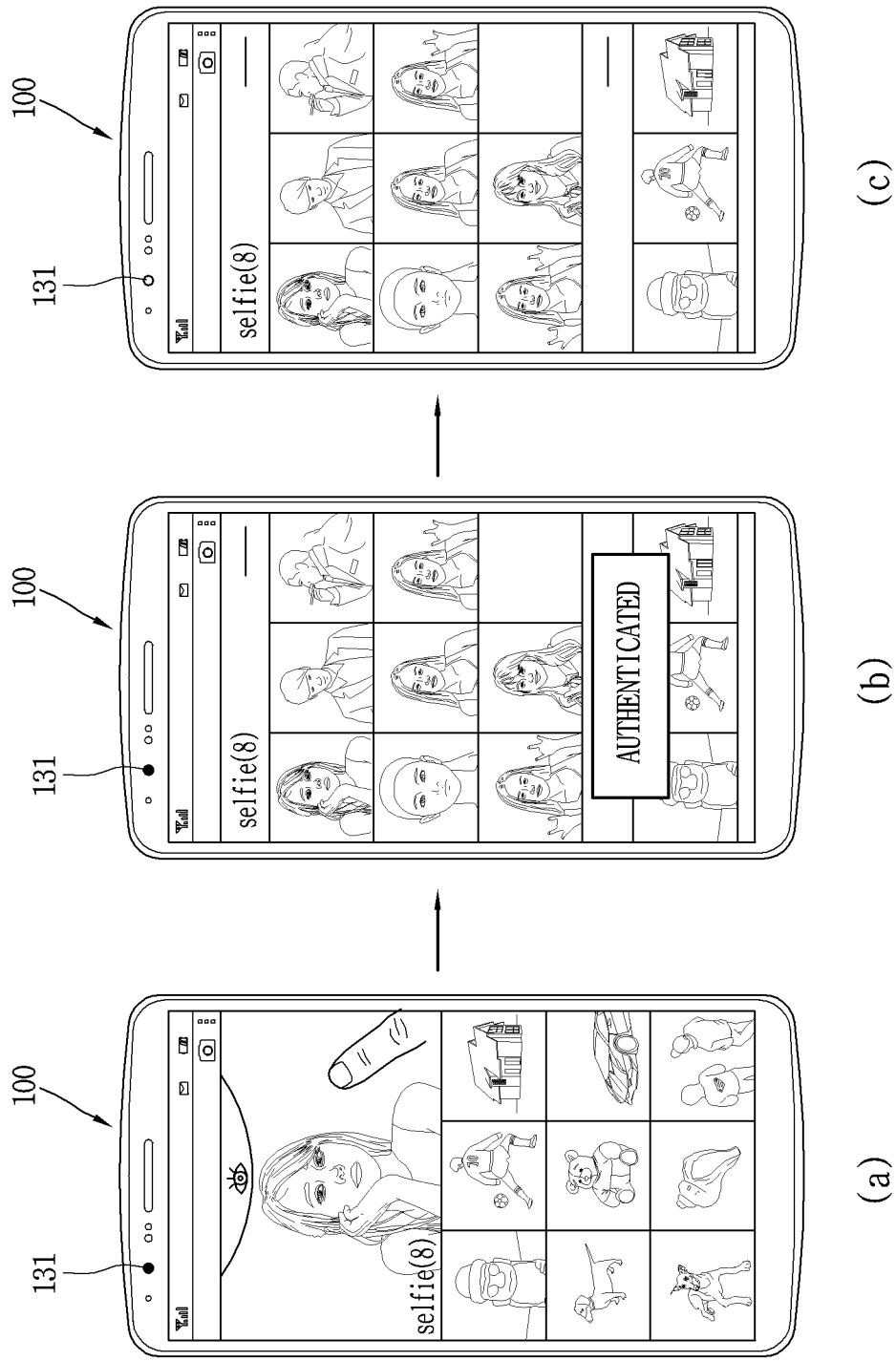

MOBILE TERMINAL

CROSS-REFERENCE TO RELATED APPLICATIONS

This Application is the National Phase of PCT International Application No. PCT/KR2016/014691 filed on Dec. 15, 2016, which claims the priority benefit under 35 U.S.C. § 119(a) to Korean Patent Application No. 10-2016-0096400 filed in the Republic of Korea on Jul. 28, 2016, all of which are hereby expressly incorporated by reference into the present application.

BACKGROUND OF THE INVENTION

1. Field of the Invention

The present disclosure relates to a mobile terminal provided with a camera module mounted with a plurality of filters.

2. Description of the Related Art

Terminals may be divided into mobile/portable terminals and stationary terminals according to their mobility. Furthermore, mobile terminals may be divided into handheld terminals and vehicle mounted terminals according to whether or not it can be directly carried by a user.

The functions of mobile terminals have been diversified. For example, the functions may include data and voice communication, photographing and video shooting through a camera, voice recording, playing a music file through a speaker system, and displaying an image or video on a display unit. Some terminals further include an electronic game play function or perform a multimedia player function. In particular, in recent years, mobile terminals may receive multicast signals that provide visual content such as broadcast, video or television programs.

As it becomes multifunctional, for example, such a terminal is allowed to capture still images or moving images, play music or video files, play games, receive broadcast and the like, so as to be implemented as an integrated multimedia player.

Meanwhile, in recent years, technologies for authenticating a user using his or her body part such as a user's fingerprint have been developed, but there is a problem in which accuracy is somewhat inferior in the case of fingerprint recognition. In particular, in the case of fingerprint recognition, there is a risk of hacking, system error may occur due to sweat or water, and fingerprint registration is also difficult for a user who has worn-out fingerprints.

SUMMARY OF THE INVENTION

An object of the present disclosure is to solve the above-mentioned problems and other problems. Another object of the present disclosure is to provide a mobile terminal capable of iris recognition.

In order to achieve the foregoing and other objects, a mobile terminal according to the present disclosure may include a terminal body, and a camera module provided in the terminal body, wherein the camera module includes a lens assembly, an image sensor provided at a lower end of the lens assembly, a first actuator mounted with a first filter and a second filter provided on one side of the lens assembly to filter light incident on the image sensor and a filter change device configured to move the first filter or the second filter to selectively overlap with the lens assembly, and a cover that constitutes an appearance of the camera module and comprises a through hole corresponding to the optical axis, the cover provided with an inner space for accommodating the lens assembly and the first actuator.

According to an example, the inner space may include a first region that accommodates the first and second support walls and a region of the second actuator, and a second region that accommodates a first plate comprising the first and second filters and the first and second protruding portions, and the second region may be formed smaller than the first region, and thus the lens assembly and the first actuator may be more stably fixed by the cover.

According to an example, the first filter may be formed at one end portion of a first link rotating about a first rotation shaft, and the second filter may be formed at one end portion of a second link rotating about a second rotation shaft, and the first actuator may include a third link coupled to one end portion of the first link and the second link; a third coil formed to surround the third link; and a third magnet disposed around the third coil to generate a third electromagnetic force by an interaction with the third coil, and the first and second links may rotate in directions opposite to each other by the movement of the third link. Accordingly, the first and the second filter may be alternately arranged on the optical axis.

According to an example, a first gear may formed on at least part of one end portion of the first link, and a first rack gear formed to engage with the first gear may be formed at one point of the third link, and a second gear may be formed on at least part of one end portion of the second link, and a second rack gear formed to engage with the second gear may be formed at one point of the third link, and thus the first and the second filters may be exchanged without any additional drive device.

According to an example, a locked state may be switched to an iris recognition mode to release the locked state, and thus a user may perform an iris recognition function and a photographing function using a single camera.

The effects of a mobile terminal according to the present disclosure will be described as follows.

According to at least one of the embodiments of the present disclosure, there is an advantage of allowing the use of an iris recognition mode and a camera mode with a single camera module, and automatically performing switching between the iris recognition mode and the camera mode.

According to at least one of the embodiments of the present disclosure, there is an advantage of automatically entering an iris recognition mode at a specific point in time, and replacing and using two filters with a simple structure.

According to at least one of the embodiments of the present disclosure, there is an advantage of enhancing iris recognition accuracy using an infrared pass filter.

According to at least one of the embodiments of the present disclosure, there is an advantage of simplifying user authentication when an application requiring privacy protection is used.

Further scope of applicability of the present disclosure will become apparent from the detailed description given hereinafter. However, it should be understood that the detailed description and specific examples such as preferred embodiments of the invention are given by way of illustration only, since various changes and modifications within the spirit and scope of the invention will become apparent to those skilled in the art from this detailed description.

BRIEF DESCRIPTION OF THE DRAWINGS

The embodiments will be described in detail with reference to the following drawings in which like reference numerals refer to like elements wherein:

FIGS. 9 through 12 are views for explaining various embodiments related to a control method of a mobile terminal according to an embodiment of the present disclosure.

DETAILED DESCRIPTION OF THE INVENTION

Figure 1A:
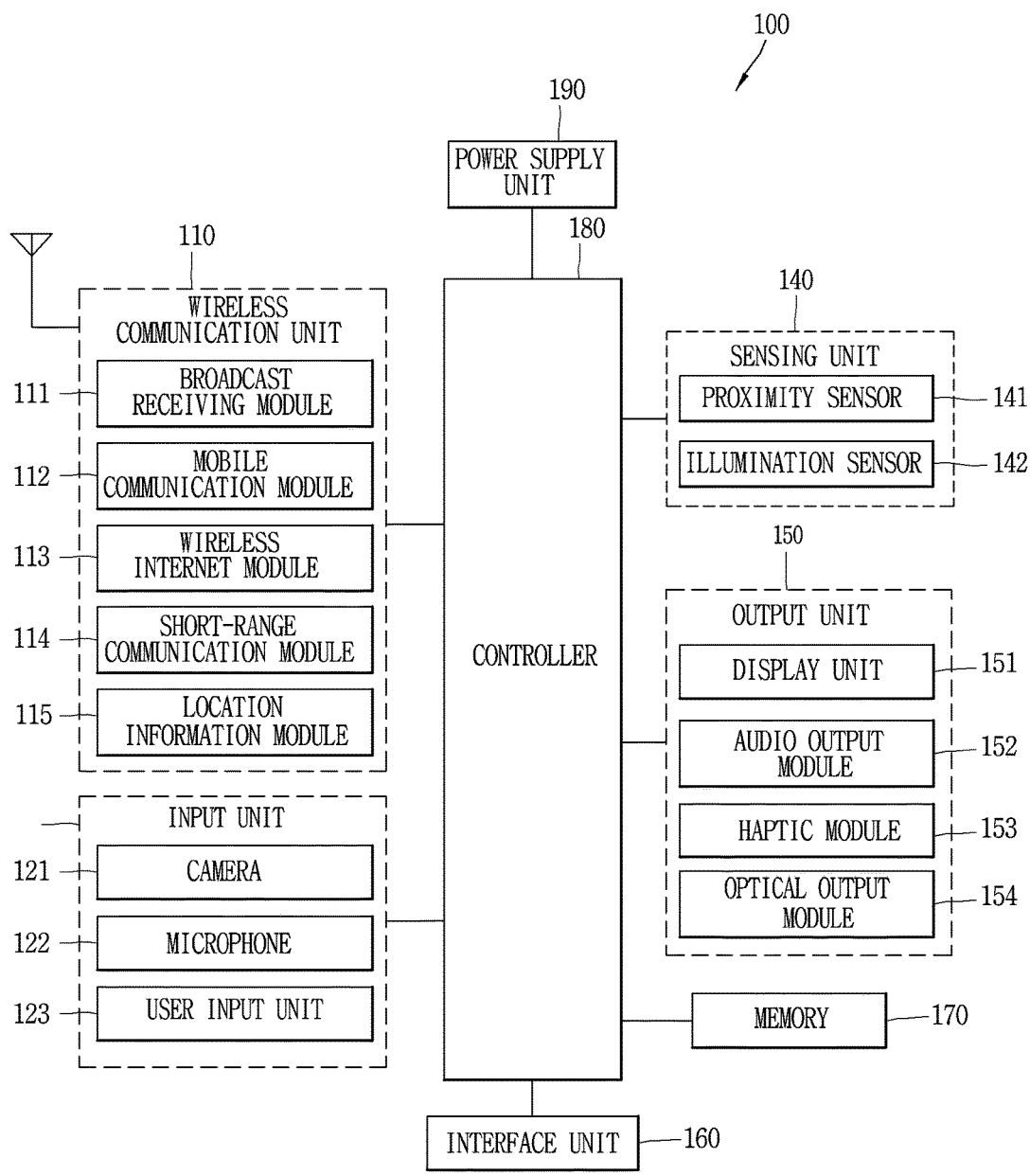
FIG. 1A is a block diagram for explaining a mobile terminal associated with the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present disclosure, moreover, the detailed description will be omitted when a specific description for publicly known technologies to which the invention pertains is judged to obscure the gist of the present disclosure. The accompanying drawings are used to help easily understand the technical idea of the present disclosure and it should be understood that the idea of the present disclosure is not limited by the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

A singular representation may include a plural representation as far as it represents a definitely different meaning from the context. Terms "include" or "has" used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like. However, it may be easily understood by those skilled in the art that the configuration according to the exemplary embodiments of this specification can also be applied to stationary terminals such as digital TV, desktop computers, digital signages, and the like, excluding a case of being applicable only to the mobile terminals.

Figure 1B:
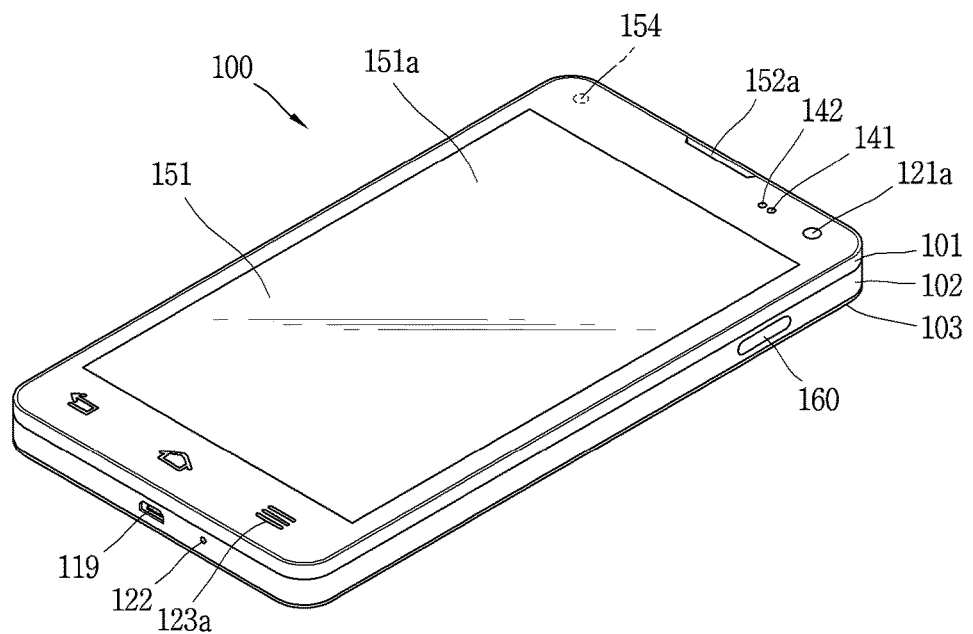
FIGS. 1B and 1C are conceptual views illustrating an example in which a mobile terminal associated with the present disclosure is seen from different directions.
Figure 1C:
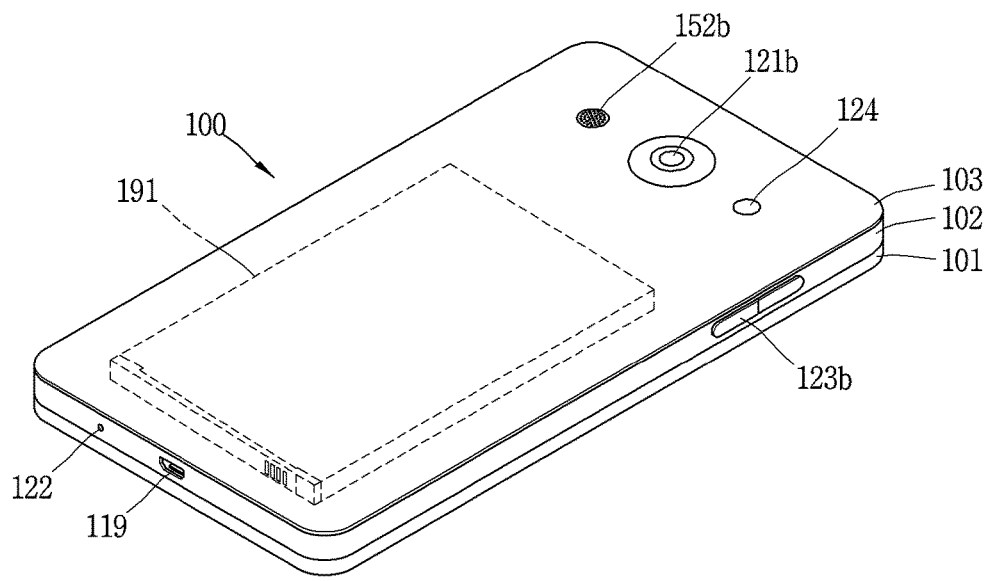

Referring to FIGS. 1A through 1C, FIG. 1A is a block diagram for explaining a mobile terminal associated with the present disclosure, and FIGS. 1B and 1C are conceptual views illustrating an example in which the mobile terminal associated with the present disclosure is seen from different directions. The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and an external server. In addition, the wireless communication unit 110 may include one or more modules for connecting the mobile terminal 100 to one or more networks.

The wireless communication unit 110 may include at least one of a broadcast receiving module 111, a mobile communication module 112, a wireless Internet module 113, a short-range communication module 114, a location information module 115 and the like. The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). The mobile terminal 100 may be configured to utilize information obtained from sensing unit 140, and in particular, information obtained from one or more sensors of the sensing unit 140, and combinations thereof.

The output unit 150 may be configured to output an audio signal, a video signal or a tactile signal. The output unit 150 may include a display unit 151, an audio output module 152, a haptic module 153, an optical output unit 154 and the like. The display unit 151 may have an inter-layered structure or an integrated structure with a touch sensor in order to facilitate a touch screen. The touch screen may provide an output interface between the mobile terminal 100 and a user, as well as functioning as the user input unit 123 which provides an input interface between the mobile terminal 100 and the user.

The interface unit 160 serves as an interface with various types of external devices that can be coupled to the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

In addition, the memory 170 stores data that support various functions of the mobile terminal 100. The memory 170 is typically implemented to store data to support various functions or features of the mobile terminal 100. For instance, the memory 170 may be configured to store application programs executed in the mobile terminal 100, data or instructions for operations of the mobile terminal 100, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Furthermore, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and/or a terrestrial channel. At least two broadcast receiving modules 111 may be provided in the portable electronic device 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

The wireless signals may include audio call signal, video (telephony) call signal, or various formats of data according to transmission/reception of text/multimedia messages. The wireless Internet module 113 refers to a module for supporting wireless Internet access, and may be built-in or externally installed on the mobile terminal 100. The wireless Internet module 113 may transmit and/or receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks. The short-range communication module 114 denotes a module for short-range communications.

Here, the another mobile terminal 100 may be a wearable device, for example, a smart watch, smart glasses or a head mounted display (HMD), which is able to exchange data with the mobile terminal 100 (or to link data with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a WiFi module, or both. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information associated with a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 processes an image frame, such as still picture or video, acquired by an image sensor in a video phone call or image capturing mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. As another example, the cameras 121 may be located in a stereoscopic arrangement to acquire left and right images for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

On the other hand, the sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may also be categorized as a proximity sensor.

On the other hand, for the sake of brief explanation, a behavior in which the pointer is positioned to be proximate onto the touch screen without contact will be referred to as "proximity touch," whereas a behavior in which the pointer substantially comes into contact with the touch screen will be referred to as "contact touch." For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, the touch object body may be a finger, a touch pen or stylus pen, a pointer, or the like as an object through which a touch is applied to the touch sensor.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swype touch, a hovering touch, and the like.

An ultrasonic sensor may be configured to recognize position information relating to a sensing object by using ultrasonic waves. On the other hands, the controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor (or image sensor) and a laser sensor.

Implementing the camera 121 with a laser sensor may allow detection of a touch of a physical object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may display (output) information processed in the mobile terminal 100. For example, the display unit 151 may display execution screen information of an application program driven in the mobile terminal 100 or user interface (UI) and graphic user interface (GUI) information in response to the execution screen information.

Furthermore, the display unit 151 may also be implemented as a stereoscopic display unit for displaying stereoscopic images.

The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. Also, the audio output module 152 may also provide audible output signals associated with a particular function (e.g., a call signal reception sound, a message reception sound, etc.) carried out by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be configured to transmit tactile effects through a user's direct contact, or a user's muscular sense using a finger or a hand. Two or more haptic modules 153 may be provided according to the particular configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be ended as the mobile terminal senses a user's event checking.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, a device having the identification module (hereinafter, an "identification device") may be fabricated in the form of a smart card. Accordingly, the identifying device may be connected with the electronic device 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Such various command signals or power inputted from the cradle may operate as signals for recognizing that the mobile terminal 100 has accurately been mounted to the cradle.

The memory 170 can store programs to support operations of the controller 180 and store input/output data (for example, phonebook, messages, still images, videos, etc.). The memory 170 may store data associated with various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a locked state for restricting a user from inputting a control command with respect to applications when a state of the mobile terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the electronic device 100 under the control of the controller 180. The power supply unit 190 may include a battery, which is typically rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring now to FIGS. 1B and 1C, the mobile terminal 100 is described with reference to a bar-type terminal body. However, the present disclosure may not be necessarily limited to this, and may be also applicable to various structures such as a watch type, a clip type, a glasses type, a folder type in which two or more bodies are coupled to each other in a relatively movable manner, a slide type, a swing type, a swivel type, and the like. The description in association with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (for example, a frame, a housing, a cover, etc.) constituting the appearance thereof. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproof portion may include a waterproof member provided between the window 151a and the front case 101, between the front case 101 and the rear case 102, or between the rear case 102 and the back cover 103, to hermetically seal an inner space when those cases are coupled to each other.

The mobile terminal 100 may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

However, the foregoing configuration may not be necessarily limited to the arrangement. The foregoing configuration may be excluded, substituted or disposed on another surface if necessary. For example, the first manipulation unit 123a may not be disposed on the front surface of the terminal body, and the second audio output module 152b may be disposed on the side surface other than the rear surface of the terminal body.

The display unit 151 may display (output) information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 may output light for indicating an event generation. Examples of the event generated in the electronic device 100 may include a message reception, a call signal reception, a missed call, an alarm, a schedule notice, an email reception, information reception through an application, and the like. When a user's event check is sensed, the controller 180 may control the optical output unit 154 to end the output of light.

The first camera 121a may process video frames such as still or moving images acquired by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may employ any method if it is a tactile manner allowing the user to perform manipulation with a tactile feeling such as touch, push, scroll or the like. In addition, the first and second manipulation units 123a and 123b may also employ a method of allowing the user to perform manipulation without a tactile feeling through a proximity touch, a hovering touch, or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap with the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a fingerprint recognition sensor for recognizing a user's fingerprint, and the controller 180 may use fingerprint information sensed through the finger recognition sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject. The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1A) for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Furthermore, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may link with the display unit 151 to extend the function of the mobile terminal 100. Another example of the accessory may be a touch pen for assisting or extending a touch input onto a touch screen.

Figure 2:
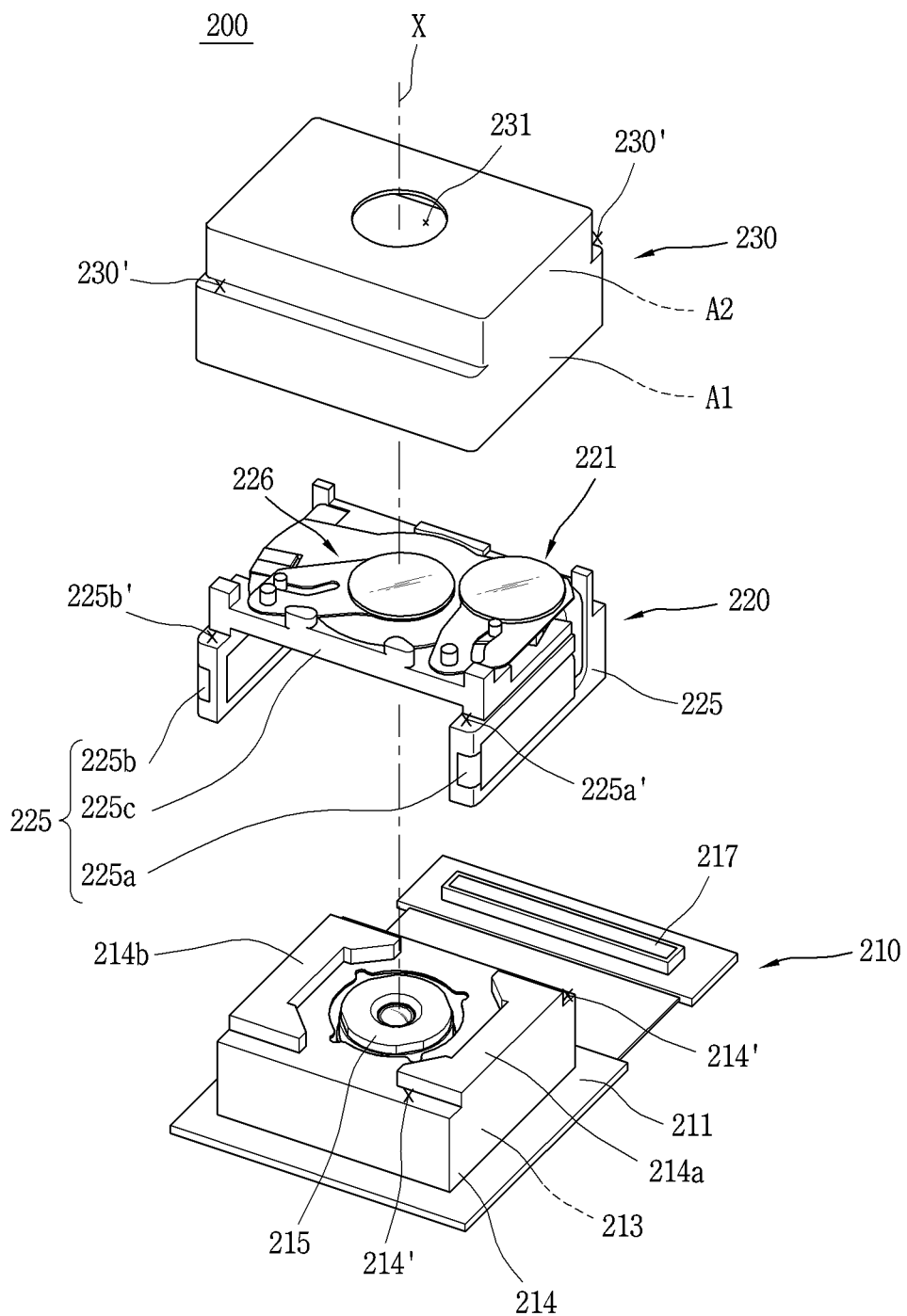
FIG. 2 is an exploded perspective view illustrating a camera module according to an embodiment of the present disclosure.
Figure 3A:
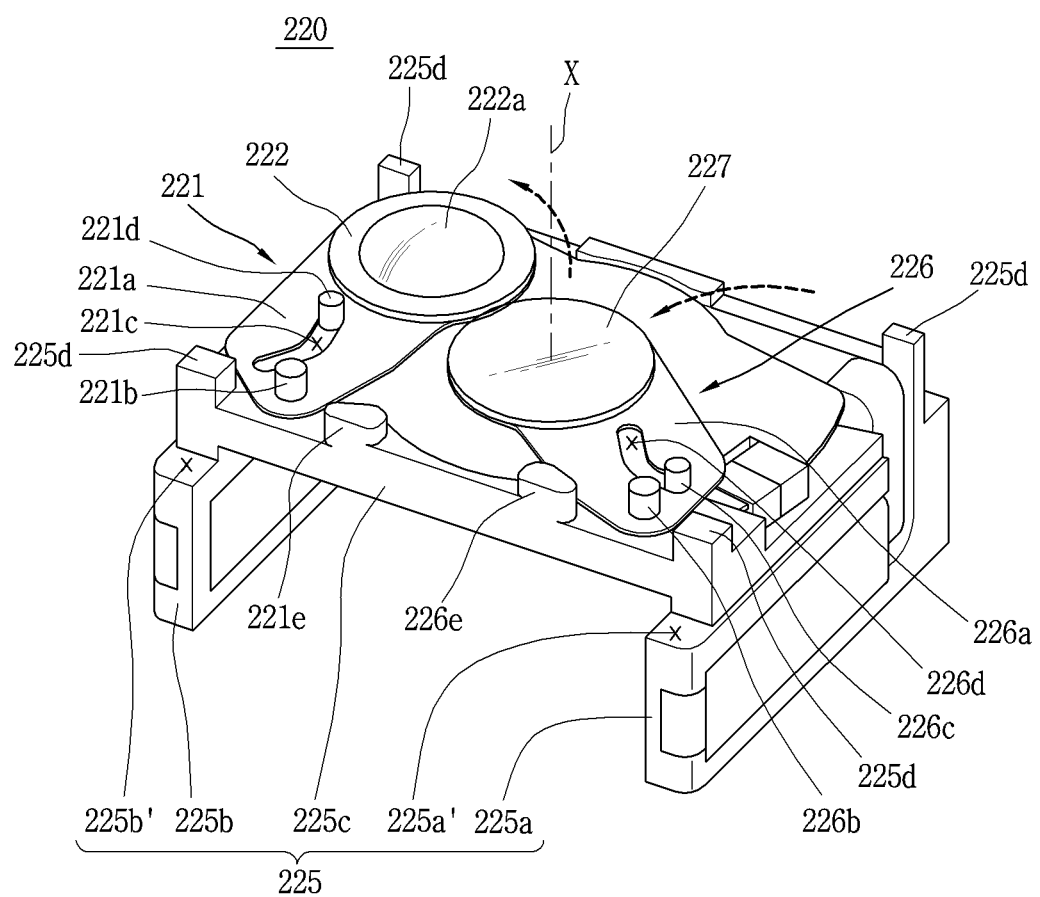
FIG. 3A is a state diagram of a first actuator in a camera mode according to an embodiment of the present disclosure.
Figure 3B:
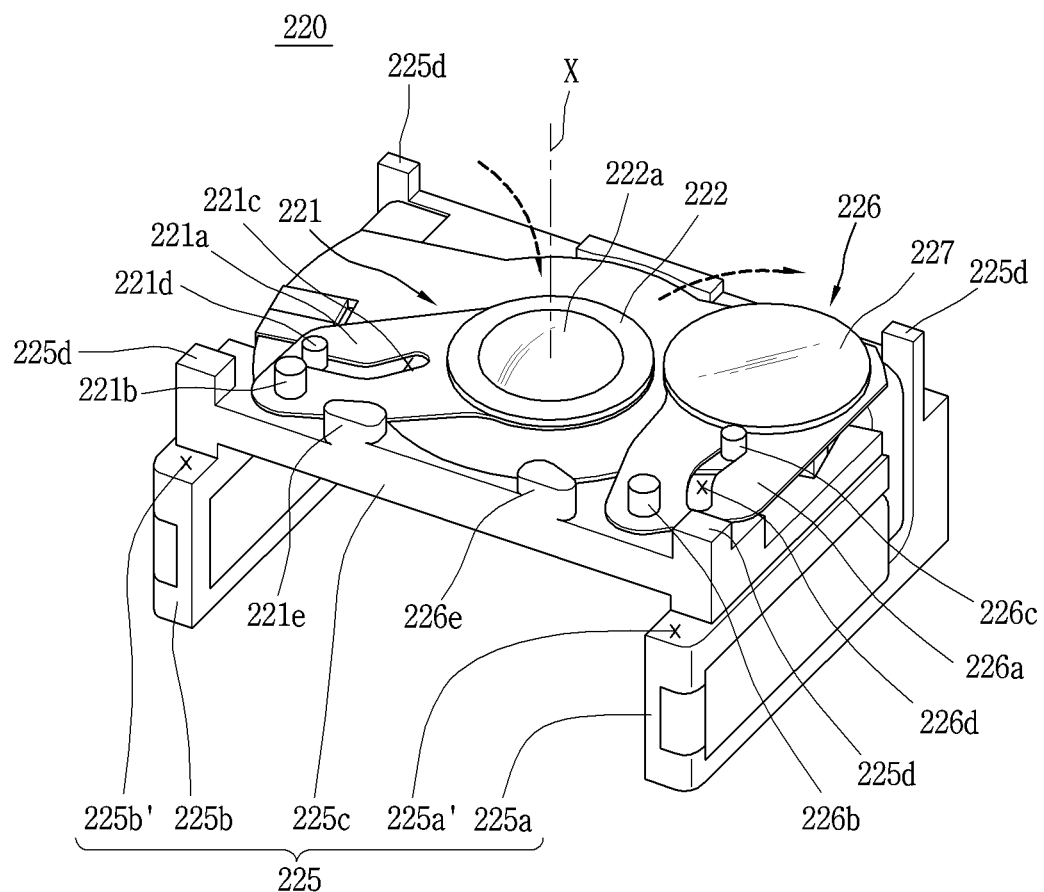
FIG. 3B is a state diagram of a first actuator in an iris recognition mode according to an embodiment of the present disclosure.

FIG. 2 is an exploded perspective view illustrating a camera module 200 according to an embodiment of the present disclosure, and FIG. 3A is a state diagram of a first actuator 220 in a camera mode according to an embodiment of the present disclosure, and FIG. 3B is a state diagram of the first actuator 220 in an iris recognition mode according to an embodiment of the present disclosure.

In an embodiment of the present disclosure, a technology of using two filters at the same time by replacing the positions of two filters provided in the camera module 200 is disclosed. At this time, the camera module 200 may be a front camera 121a or a rear camera 121b provided on a front surface of the mobile terminal 100, but the camera module 200 in an embodiment of the present disclosure is preferably regarded as the front camera 121a, taking into consideration that iris recognition is carried out by the camera module 200 as will be described later.

Hereinafter, the present disclosure will be described on the assumption that the first filter 222 is an IR pass filter and the second filter 227 is an IR cut filter, but the present disclosure is not limited thereto, and will be applicable to any filters in the camera module 200 having two or more filters for performing different functions in a single camera module 200 without any particular limitation.

A mobile terminal 100 according to an embodiment of the present disclosure includes a terminal body and a camera module 200 provided in the terminal body, and the camera module 200 includes a lens assembly 215 formed along an optical axis (X), an image sensor 211 provided at a lower end of the lens assembly 215, and a first filter 222 and a second filter 227 provided on one side of the lens assembly 215 and selectively disposed on the optical axis (X) to selectively filter light incident on the image sensor 211.

The first filter 222 and the second filter 227 will be described to have a function of filtering infrared rays or visible rays of light incident on the image sensor 211, but the present disclosure is not limited thereto. For example, the first filter 222 and the second filter 227 may be any one of filters used for the camera module 200, such as an ultra violet filter used to transmit visible rays and cut off ultra-violet rays, a polarizing filter used to filter light oscillating in a specific direction, a neutral density (ND) filter used to reduce all types of light evenly, and a cross filter that forcibly disperses light to add an effect of shining light on a photo.

The first filter 222 and the second filter 227 perform their functions by being located at a position of the optical axis (X) which is the center axis of the aperture of the lens assembly 215, and the first filter 222 and the second filter 227 perform different functions and thus cannot be used at the same time. Accordingly, the content of the present disclosure will be applied to the camera module 200 having two or more filters mounted on one lens assembly 215.

The first actuator 220 includes movable devices for alternatively moving the first and second filters 222, 227 of the first and second filter units 221, 226. The first filter unit 221 includes a second plate 221a on which the first filter 222 is mounted, a first shaft 221b fixed to the first plate 225c to rotate the second plate 221a, a first guide groove 221c formed in the second plate 221a to guide a rotational direction of the second plate 221a, and a first guide protrusion 221d protruded from the frame 225 (more specifically, the first plate 225c of the frame 225) to be inserted into the first guide groove 221c.

The first shaft 221b is formed adjacent to one end of the second plate 221a, and the first filter 222 is disposed adjacent to the other end of the second plate 221a. The first guide groove 221c is formed between the first shaft 221b and the first filter 222, and may be formed in a curved shape to rotate the second plate 221a about the first shaft 221b.

On the other hand, a first stopper 221e protruded from one edge of the frame 225 (more specifically, the first plate 225c of the frame 225) is formed. In a state illustrated in FIG. 3B, the first stopper 221e prevents the second plate 221a from further rotating to prevent the first filter 221 from moving to an outside of the first plate 225c.

Meanwhile, the second filter unit 226 includes a third plate 226a on which the second filter 227 is mounted, a second shaft 226b fixed to the first plate 225c to rotate the third plate 226a, a second guide groove 226c formed in the third plate 226a to guide a rotational direction of the third plate 226a, and a second guide protrusion 226d protruded from the first plate 225c to be inserted into the second guide groove 226c.

The second shaft 226b is formed adjacent to one end of the third plate 226a, and the second filter 226 is disposed adjacent to the other end of the third plate 226a. The second guide groove 226c is formed between the second shaft 226b and the second filter 226, and may be formed in a curved shape to rotate the third plate 226a about the second shaft 226b.

On the other hand, a second stopper 226e protruded from one edge of the frame 225 (more specifically, the first plate 225c of the frame 225) is formed. In a state illustrated in FIG. 3A, the second stopper 226e prevents the third plate 226a from further rotating to prevent the second filter 226 from moving to an outside of the first plate 225c. Furthermore, the first plate 225c includes a stopper 225d respectively formed at a plurality of corners.

The camera module 200 in an embodiment of the present disclosure may include a lens unit 210 including the lens assembly 215 and a second actuator 213 (auto focusing actuator), which is an AF actuator provided with an image sensor 211 and a connector 217 to automatically adjust focus. The second actuator 213 may be a voice coil motor (VCM) type, but the present disclosure is not limited thereto, and may be an encoder type or a piezo type actuator.

A first filter unit 221 including the first filter 222 and a second filter unit 226 including the second filter 227 are provided in the first actuator 220, and the first actuator 220 may be formed to cover an upper surface of the lens assembly 215. The first filter unit 221 and the second filter unit 226 are mounted on the frame 225, and in the case of the add-on type camera module 200, the frame 225 may have a substantially "C"-shape or "⊏"-shape.

However, the present disclosure is not limited thereto, and the first filter 222 and the second filter 227 may be inserted into the lens assembly 215. Here, the former may be referred to as an add-on type and the latter as an add-in type. Although the add-on type is mainly described in an embodiment of the present disclosure, the add-on type may be applied to the add-in type camera module 200 unless otherwise contradicted. In the case of the add-on type, it is somewhat disadvantageous in terms of size because the first actuator 220 is mounted on an upper side of the lens assembly 215, whereas in the case of the add-in type, it is somewhat advantageous in terms of size because the first actuator 220 is mounted inside the lens assembly 215, but disadvantageous in terms of fabrication process because more complicated than the add-on type.

In addition, in the add-on type camera module 200, as illustrated in FIG. 2, a cover 230 may be formed on an upper side of the first actuator 220. The cover 230 includes an inner space capable of accommodating the lens unit 210 and the first actuator 220 to stably accommodate the lens unit 210 and the first actuator 220 and protect them from external impact.

The first actuator 220 includes the frame 225 and the first and second filter units 221, 226 disposed on the frame 225. The frame 225 of the first actuator 220 includes first and second support walls 225a, 225b and a first plate 225c supported by the first and second support walls 225a, 225b. A region of the lens unit 210 is accommodated between the first and second support walls 225a, 225b, and the first plate 225c is disposed on an accommodation unit 214 that accommodates the second actuator 213.

A distance between the first and second support walls 225a, 225b may be substantially the same as a width of one side of the accommodation unit 214. Accordingly, it may be possible to minimize an error occurring during assembly between the first actuator 220 including the first and second filter units 221, 226 and an accommodation unit 214 that accommodates the lens assembly 215, and minimize vibration generated between the first actuator 220 and the second actuator 213. Therefore, the leakage of light may be minimized to improve the quality of image.

When the first plate 225c is disposed on the first and second support walls 225a, 225b, a pair of first and second steps 225a', 225b' are formed by a difference in width between the first and second support walls 225a, 225b and the first plate 225c. On the other hand, first and second protruding portions 214a, 214b are formed on an upper surface of the accommodation unit 214 on which the first plate 225c is mounted. The first and second protruding portions 214a, 214b may be formed adjacent to the first and second support walls 225a, 225b, and formed to surround a region where the lens assembly 215 is exposed. A step portion 214' formed by the first and second protruding portions 214a, 214b is formed at an upper portion of the accommodation unit 214.

When the frame 225 is mounted on the accommodation unit 214, the first and second protruding portions 214a, 214b are disposed to be continuous with the step portion 214'. In other words, the first plate 225c is supported by the first and second protruding portions 214a, 214b.

The cover 230 includes a depressed portion 230' corresponding to the step portion 214'. The depressed portion 230' of the cover 230 is inserted between the step portion 214' and the first and second steps 225a', 225b'. In other words, an inner space of the cover 230 includes first and second spaces (A1, A2). A lower portion of the second actuator 213 and the first and second support walls 225a, 225b are accommodated in the first space (A1). A width of the second space (A2) is formed to be smaller than that formed with the depressed portion 230'. The first plate 225c and the protruding portions 214a, 214b are accommodated in the second space (A2).

Accordingly, each region of the first actuator 220 and the second actuator 213 may be fixed by the first and second spaces (A1, A2) of the cover 230, thereby preventing components in an inner region of the cover 230 from moving or being separated from each other. Accordingly, the lens assembly 215, the first filter unit 221 or the second filter unit 226, and the through hole 231 may be accurately and stably arranged.

Furthermore, an inner space of the terminal body 100 may be secured by the depressed portion 230', thereby alleviating impact applied to the camera module 200. Although not illustrated in the drawing, a guide groove for mounting the frame 225 may be formed in a region of the image sensor 211. A through hole 231 is formed at the center of the cover 230 to allow light to be incident on the lens assembly 215 from the outside. At this time, a line connecting the centers of the through-hole 231 and the lens assembly 215 becomes an optical axis (X).

In an embodiment of the present disclosure, a case where the second filter 227 is located on the optical axis (X) of the camera module 200 and the first filter 222 is deviated from the optical axis (X) of the camera module 200 as illustrated in FIG. 3A is referred to as a first state, and a case where the first filter 222 is located on the optical axis (X) of the camera module 200 and the second filter 227 is deviated from the optical axis (X) of the camera module 200 as illustrated in FIG. 3B is referred to as a second state. In other words, when the first filter 222 is an infrared pass filter and the second filter 227 is an infrared cut filter, the first state may be a general camera mode state, and the second state may be an iris recognition mode state.

In an embodiment of the present disclosure, two or more filters are provided at the same time in a single camera module 200 to perform each function of the filters at different times.

Figure 4:
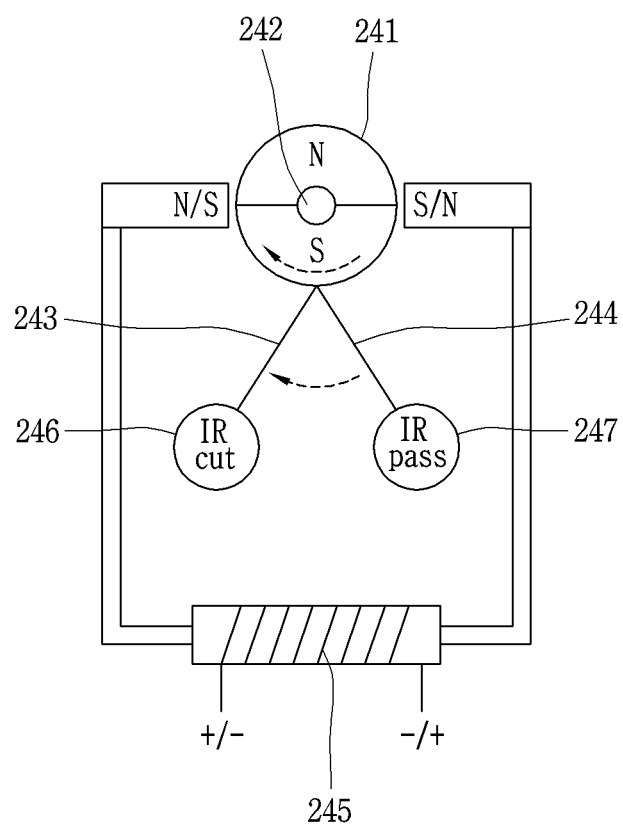
FIG. 4 is a conceptual view for explaining the principle of a device for changing a first filter and a second filter according to an embodiment of the present disclosure.

FIG. 4 is a conceptual view for explaining the operating principle of a filter change device for changing a first filter 246 and a second filter 247 according to an embodiment of the present disclosure, and the operating principle of the filter change device will be described with reference to FIG. 4. A rotation shaft 242 is provided at the center of the magnet 241 and a first link 243 and a second link 244 extended from the rotation shaft 242 are provided, and a first filter 246 is provided at an end portion of the first link 243, and a second filter 247 is provided at an end portion of the second link 244. The first link 243 and the second link 244 are spaced apart to form a predetermined angle, and rotate together as the rotation shaft 242 rotates.

The first state is a state in which the first filter 246 and the second filter 247 are located at predetermined positions to perform a first function, and the second state is a state in which the positions of the first filter 246 and the second filter 247 are changed to perform a second function different from the first function. For example, when the first filter 246 is an infrared cut filter and the second filter 247 is an infrared pass filter, the infrared cut filter is located on the optical axis (X) of the camera module 200 in the first state to operate in a camera mode, and the infrared cut filter is released from the optical axis (X) and the infrared pass filter is located on the optical axis (X) of the camera module 200 in the second state to operate in an iris recognition mode. At this time, the first state may be set to a default state. In other words, it may be automatically restored to the first state when the function carried out in the second state is completed. For this purpose, a torsion spring may be provided on the rotation shaft 242. Here, the function carried out in the second state may denote all functions carried out while the display is in an active state.

The rotation of the first link 243 and the second link 244 is enabled by an electromagnetic force generated by an interaction between the magnet 241 and the coil 245 (or solenoid). In other words, when current is applied to the coil 245, an electromagnetic force is generated to rotate the magnet 241, and the rotation shaft 242 coupled to the magnet 241 is also rotated together with the magnet 241. As described above, when current is applied, the first link 243 and the second link 244 are rotated in a specific direction, and when the current is interrupted, the first link 243 and the second link 244 are restored to an initial state (first state) by the torsion spring or the like. As described above, a change of magnetic direction induced in accordance with the direction of the current applied to the coil is generated to rotate the first filter 246 and the second filter 247.

Figure 5:
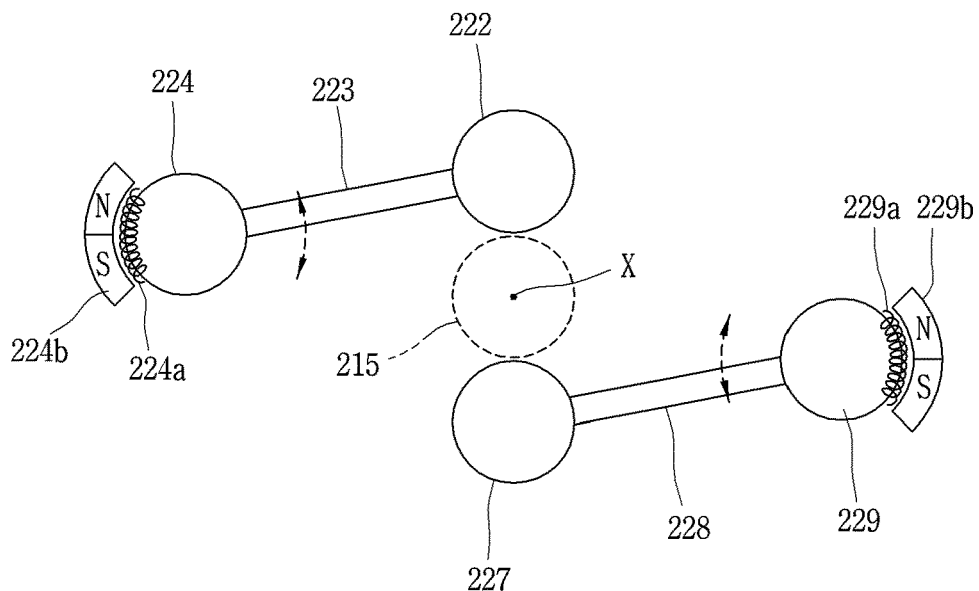
FIGS. 5 and 6 are conceptual views for explaining a filter change mechanism according to an embodiment of the present disclosure.

The foregoing case is a case where the first and second rotation shafts 224, 229 are formed at the same position or integrally formed with each other, and the first coil 224a and the second coil 229a are the same, and the first magnet 224b and the second magnet 229b are the same in FIG. 5.

Figure 6:
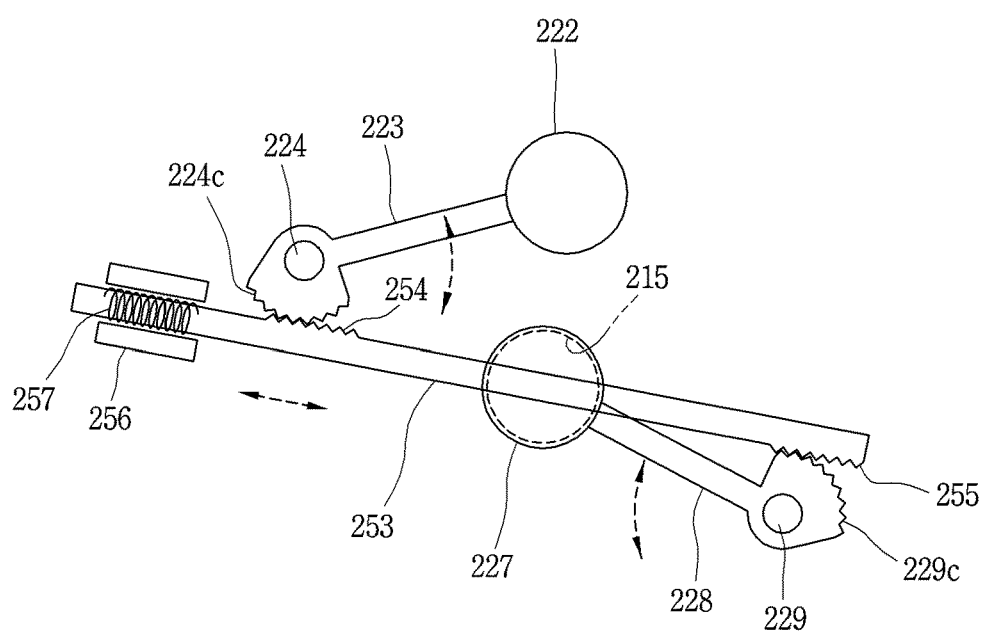

On the other hand, FIGS. 5 and 6 are conceptual views for explaining a filter change device according to an embodiment of the present disclosure, and hereinafter, the process of changing the positions of the first filter 222 and the second filter 227 will be described with reference to FIGS. 5 and 6.

First, referring to FIG. 5, the first filter 222 is formed at one end portion of a first link 223 rotating about the first rotation shaft 224, and the second filter 227 is formed at one end portion of a second link 223 rotating about the second rotation shaft 229. In other words, a first filter 222 is disposed at one end portion of the first link 223, and a first rotation shaft 224 is formed at the other end thereof, and a second filter arrangement region 227 is formed at one end portion of the second rotation shaft, and the second rotation shaft 229 is formed at the other end thereof.

Referring to FIGS. 3A and 5, the first rotation shaft 224 is integrally formed with or coupled to the first shaft 222b, and the first link 223 is integrally formed with the second plate 222a or coupled to each other. Furthermore, the first rotation shaft 229 is integrally formed with or coupled to the second shaft 226b, and the second link 228 is integrally formed with the third plate 226a or coupled to each other.

In an embodiment of the present disclosure, the first actuator 220 performs the role of a drive unit for changing the positions of the first filter 222 and the second filter 227. For this purpose, the first actuator 220 uses an electromagnetic force in an embodiment of the present disclosure.

More specifically, the first actuator 220 includes a first coil 224a formed to surround the first rotation shaft 224 and a first magnet 224b spaced apart from the first coil 224a to generate a first electromagnetic force by an interaction with the first magnet 224b. The first filter 222 is rotated around the first rotation shaft 224 by a first electromagnetic force generated by the first coil 224a and the first magnet 224b. In FIG. 5, the lens assembly 215 is shown in a dotted line for understanding, and the center of the lens assembly 215 forms an optical axis (X).

Furthermore, the lens assembly 215 includes a second coil 229a formed to surround the second rotation shaft 229 so as to change the position of the second filter 227 and a second magnet 229b configured to generate an electromagnetic force by an interaction with the second coil 229a. The position of the second filter 227 is changed by rotating the second filter 227 about the second rotation shaft 229 by the second electromagnetic force as in the first filter 222.

At this time, the first and second rotation shafts 224, 229 may form the rotation axes of the first and second filters 222, 227, and the first and second rotation shafts 224, 229 may be disposed at different positions. However, the present disclosure is not limited thereto, and the first rotation shaft 224 and the second rotation shaft 229 may be disposed at the same position or may be integrally formed. The first filter 222 and the second filter 227 are selectively located on the optical axis (X) by the first and second electromagnetic forces.

Furthermore, each of the first filter 222 and the second filter 227 is provided with a torsion spring to restore the first filter 222 and the second filter 227 to a preset state when power supply is cut off. On the other hand, referring to FIG. 6, a third link 253 connecting the first link 223 and the second link 228 may be added to rotate the first link 223 and the second link 228 by a reciprocating movement of the third link 253. More specifically, the first actuator 220 may include a third link 253 coupled to one end portion of the first filter 222 and the second filter 227, a third coil 256 formed to surround the third link 253, and a third magnet 257 disposed around the third coil 256 to generate a third electromagnetic force by an interaction with the third coil 256. A third electromagnetic force is generated by an interaction between the third coil 256 and the third magnet 257, and the third link 253 is linearly moved by the third electromagnetic force. As described above, the first link 223 and the second link 228 rotate in opposite directions by the movement of the third link 253.

If the third link 253 moves upward in FIG. 6, the first link 223 rotates about the first rotation shaft 224 to locate the first filter 222 on the optical axis (X) of the camera module 200, and the second link 228 rotates about the second rotation axis 229 to deviate the second filter 227 from the optical axis (X) of the camera module 200. Furthermore, if the third link 253 moves downward in FIG. 6, the first link 223 rotates about the first rotation shaft 224 to deviate the first filter 222 from the optical axis (X) of the camera module 200, and the second link 228 rotates about the second rotation axis 229 to locate the second filter 227 on the optical axis (X) of the camera module 200.

At this time, each end portion of the first link 223 and the second link 228 and the third link 253 are fastened by gear coupling. In other words, a first gear 224c is formed at least part of one end portion of the first link 223, and a first rack gear 254 formed to engage with the first gear 224c at one point of the third link 253 is formed to gear-couple the first link 223 to the third link 253. The second link 228 and the third link 253 are also coupled in the same manner. In other words, a second gear 229c is formed at least part of one end portion of the second link 228, and a second rack gear 255 formed to engage with the second gear 229c at one point of the third link 253 is formed to gear-couple the second link 228 to the third link 253.

Referring to FIGS. 3A and 6 together, the first rotation shaft 224 is integrally formed with or coupled to the first shaft 222b, and the first link 223 is integrally formed with the second plate 222a or coupled to each other. Furthermore, the first rotation shaft 229 is integrally formed with or coupled to the second shaft 226b, and the second link 228 is integrally formed with the third plate 226a or coupled to each other.

Here, the first filter 222 may be an infrared (IR) pass filter that transmits infrared rays to the image sensor 211, and the second filter 227 may be an infrared cut filter (IR) cut filter provided on one side of the infrared pass filter that cuts off infrared rays transmitted to the image sensor 211. In this case, the mobile terminal 100 operates in a camera mode during a first state in which the first filter 222 is located on the optical axis (X) of the camera module 200, and operates in an iris recognition mode during a second state in which the second filter 227 is located on the optical axis (X) of the camera module 200.

On the other hand, the rotation angles of the first link 223 and the second link 228 may not be necessarily the same in FIG. 5, but the rotation angles of the first link 223 and the second link 228 may be the same in FIG. 6. Furthermore, in FIG. 6, the optical axis (X) may be located on the third link 253, but the present disclosure is not limited thereto. For example, the optical axis (X) of the camera module 200 may be formed on an upper or lower side of the third link 253.

In an embodiment of the present disclosure, when the first filter 222 is used as an infrared pass filter, a focal-length reducing lens 221a must be formed in the infrared pass filter. It is to reduce the focal length of the lens assembly 215. In general, a focal distance of the infrared cut filter used for the camera module 200 is 40 cm or more, but it is required to reduce the focal distance to recognize a user's iris. To this end, in an embodiment of the present disclosure, as illustrated in FIGS. 3A and 3B, the infrared pass filter is provided with a focal-length reducing lens 222a for reducing the focal distance. Moreover, the infrared pass filter performs a function of reducing the field of view (FOV) since it is a filter for taking a close-up photo of the user's iris near the user's eyes.

As described above, in the embodiment of the present disclosure, the focal-distance reducing lens 222a may be used to reduce the focal length of the lens assembly 215 as well as reduce the size of the angle of view, thereby allowing the mobile terminal to be optimized for iris recognition. The focal-length reducing lens 222a may be formed in a form of being attached to the first filter 222. The focal-length reducing lens 222a may be, for example, a diffraction optical element (DOE) lens. The DOE lens performs a function of reducing the focal length.

Figure 7A:
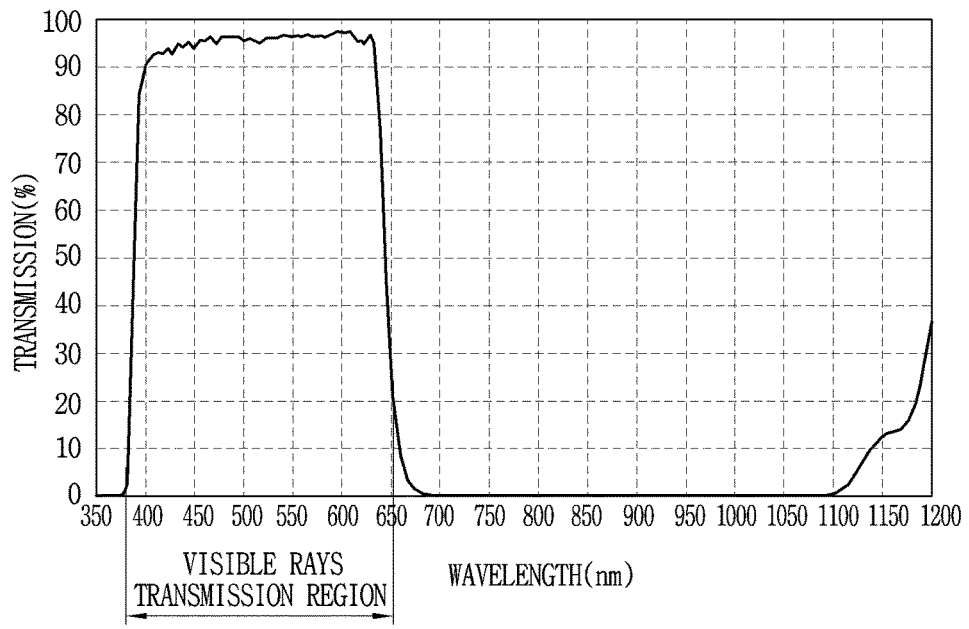
FIG. 7A is a graph illustrating the transmittance of each wavelength band when an infrared cut filter is used in an embodiment of the present disclosure.
Figure 7B:
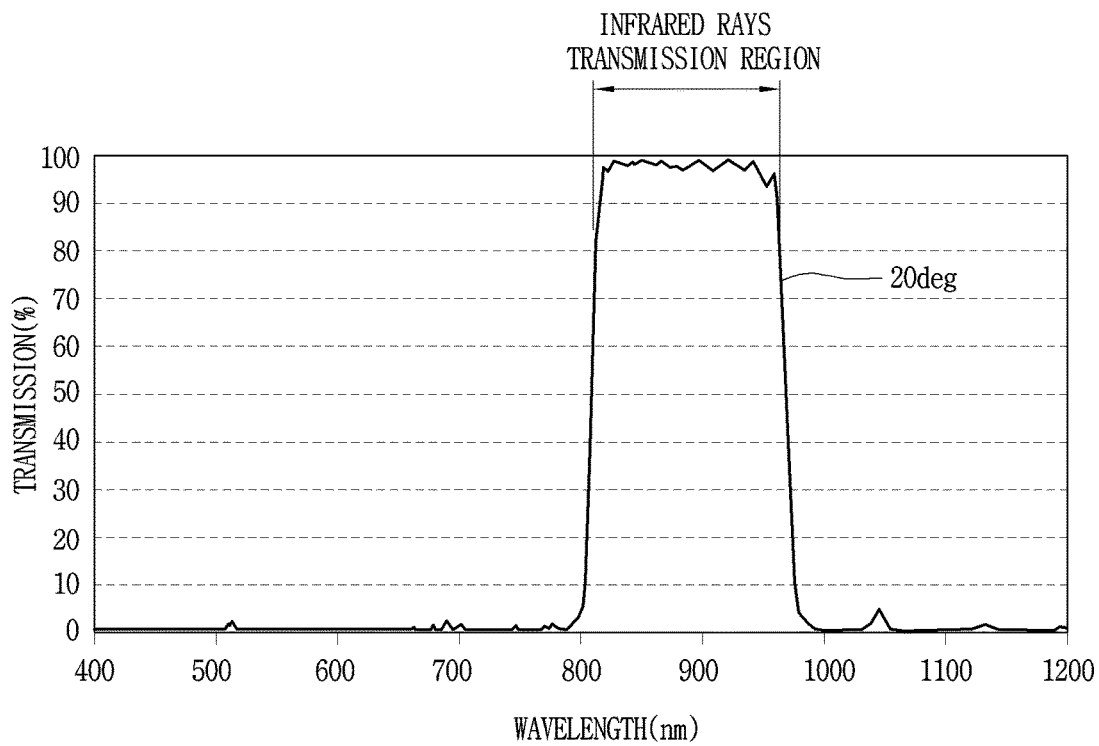
FIG. 7B is a graph illustrating the transmittance of each wavelength band when an infrared pass filter is used in an embodiment of the present disclosure.

FIG. 7A is a graph illustrating the transmittance of each wavelength band when an infrared cut filter is used in an embodiment of the present disclosure, and FIG. 7B is a graph illustrating the transmittance of each wavelength band when an infrared pass filter is used in an embodiment of the present disclosure.

As illustrated in FIG. 7A, in the first state, the infrared cut filter transmits visible rays and cuts off infrared rays, thereby allowing the mobile terminal 100 to operate in a camera mode. On the contrary, in the second state, the infrared pass filter operates to transmit infrared rays and cut off visible rays to allow the mobile terminal 100 to operate in an iris recognition mode. As described above, in the second state for recognizing the iris, visible rays must be cut off from being transmitted. If visible rays are transmitted, image noise is generated and thus accurate iris recognition is not carried out. In other words, when visible rays are transmitted, surrounding objects reflected in the user's eyeball are also recorded in the image sensor 211, and thus a fine pattern of the iris cannot be correctly recognized. Therefore, in an embodiment of the present disclosure, an infrared pass filter is used for iris recognition.

Figure 8:
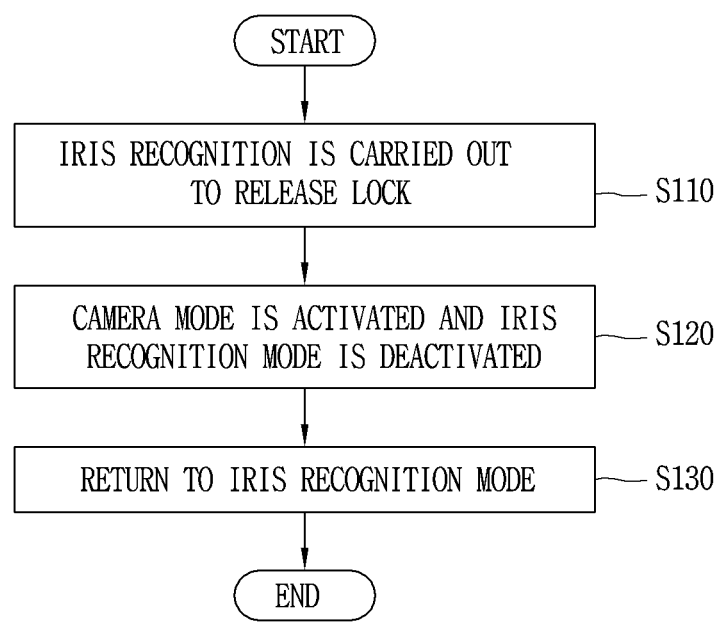
FIG. 8 is a flowchart for explaining a method of controlling a mobile terminal according to an embodiment of the present disclosure.

Hereinafter, a method of using the mobile terminal 100 according to an embodiment of the present disclosure will be described for a case where the first filter 222 is an infrared cut filter and the second filter 227 is an infrared pass filter. FIG. 8 is a flowchart illustrating a method of controlling the mobile terminal 100 according to an embodiment of the present disclosure, and FIGS. 9 through 12 are drawings for explaining various embodiments associated with the method of controlling the mobile terminal 100 according to an embodiment of the present disclosure.

In an embodiment of the present disclosure, an infrared pass filter is used to recognize a user's iris, and an infrared cut filter is used to operate in a camera mode. The infrared pass filter and the infrared cut filter are selectively located on the optical axis (X), and the mobile terminal 100 operates in an iris recognition mode when the infrared pass filter is located on the optical axis (X), and the mobile terminal 100 operates in a camera mode when the infrared cut filter is located on the optical axis (X). In other words, the mobile terminal 100 in an embodiment of the present disclosure has a structure in which the front camera 121a can be used for both the iris recognition camera and the front camera. It may be referred to as a hybrid type.

If the camera module 200 is the rear camera 121b, the mobile terminal may not operate in an iris recognition mode, and the first filter 222 and the second filter 227 may be any one of the ultra violet filter, the polarizing filter, the neutral density (ND) filter, and the cross filter.

Referring to FIG. 8, a procedure for controlling the mobile terminal 100 while the display of the locked mobile terminal 100 is turned off will be described. Here, it will be described based on the assumption that the camera module 200 is limited to the front camera 121a. In order to use the mobile terminal 100, power is supplied by pressing a power button, touching the power button or using a knock-on method to activate the mobile terminal 100. The knock-on method may be a method of lightly knocking the display two or more times.

Then, when power is supplied, an iris recognition mode is automatically activated in the mobile terminal 100, and the front camera 121a is deactivated. In other words, when the display of the mobile terminal 100 is activated, the mobile terminal is placed in a standby state to recognize a user's iris. When the user's iris is recognized in an iris recognition standby state, the locked state is released (S110). At this time, since the time taken for the user's iris recognition is short, the user may feel that lock is released while at the same time the display is turned on. As described above, in an embodiment of the present disclosure, it may be possible to seamlessly activate the display in a non-contact manner.

When the locked state is released by iris recognition, the camera mode is activated and the iris recognition mode is deactivated (S120). At this time, even when security authentication is required for privacy protection as well as the locked state, it may be authenticated by iris recognition. At this time, security authentication for privacy protection includes a procedure for authenticating himself or herself while performing an electronic commerce for purchasing an article or a financial transaction using the mobile terminal 100. At this time, when there is an attempt to enter a locked application among applications for privacy protection, the iris recognition mode is activated and the front camera is deactivated. Then, when iris recognition is carried out to authenticate a user, the front camera mode is activated and the iris recognition mode is deactivated.

Then, when the use of the mobile terminal 100 is ended, it is set to return to the iris recognition mode (S130). As described above, when the iris recognition mode is set to default, and then the display is turned on (display on), the mobile terminal immediately enters the iris recognition mode.

Hereinafter, various embodiments will be described with reference to FIGS. 9 through 12. First, description will be made with reference to FIG. 9. As illustrated in FIG. 9A, the mobile terminal 100 is in a state in which the initial display is turned off (display off). However, the mobile terminal may be in an Always-On Display (AOD) state in which at least part of the display is always on. Even in the AOD state, the display is not activated, and only information related to the time and the day of the week is displayed with minimum power.

When the display is turned on by pressing the power button or touching the power button, the mobile terminal enters a lock screen (510) state as illustrated in FIG. 9B. The lock screen state is a state in which various contents are displayed on the display but applications are not available because lock is set. Therefore, in order to release the lock, the user's iris is recognized in the iris recognition mode, and user must be authenticated.

The controller 180 activates the iris recognition mode based on the lock screen being activated or a specific touch input being applied to the lock screen. When the iris recognition mode is activated, the filter change device is operated.

The first filter 222 formed with the focal-length reducing lens 222a is disposed on the x-axis to overlap with the lens assembly 215 based on the filter change device. Accordingly, the controller 180 acquires an image for recognizing an iris through the image sensor 211 using light that has passed through the first filter 222. The controller compares the acquired image with a pre-stored iris image to perform an authentication procedure.

When the user is authenticated, the locked state of the lock screen is released to display a home screen 512 on the display unit 151 as illustrated in FIG. 9C. The home screen state is a state in which most functions are available except for some applications for the privacy protection of the mobile terminal 100. In this manner, when the locked state of the display is released, the mobile terminal 100 may be freely used. At this time, the mobile terminal 100 is in a state that can be used by another person.

However, when a touch input is applied to the photographing icon 511 included in the lock screen 510, the controller 180 activates the front camera mode, and controls the filter change device to place the second filter 226 on the x-axis. Then, when the use of the mobile terminal 100 is ended, it returns to the state of FIG. 9A, and enters the iris recognition mode.

At this time, the iris recognition mode is activated and the camera mode is deactivated in the locked state of FIG. 9A and the lock screen state of FIG. 9B. At this time, a notification unit 131 may be provided on a front surface of the mobile terminal 100 to indicate the current state of the mobile terminal. For example, the notification unit 131 may be a light source such as an LED to transmit information to a user in a different color. The LED is shown in black in FIGS. 9A and 9B, and shown in white in FIG. 9A, and FIGS. 9A and 9B illustrate an iris recognition mode, and FIG. 9C illustrates a camera mode. The notification unit 131 may be a type of the haptic module 153 described above.

Hereinafter, description will be made with reference to FIG. 10. FIG. 10A is the same state as in FIG. 9A as a state in which the display is locked, and FIG. 10B is the same state as in FIG. 9B as a locked state in which the lock screen 510 is displayed, and thus detailed description thereof will be omitted.

The control unit 180 may control the iris recognition function to be carried out using the camera module 200 based on a specific control command. The lock screen 510 may include a notification image 512 of data that has already been received. For example, when a touch input is applied to the notification image 512 or a user's gaze toward the notification image 512 is sensed by the camera, the controller 180 may activate the iris recognition mode.

The controller 180 controls the filter change device such that first filter 222 formed with the focal-length reducing lens 222a is disposed on the x-axis to overlap with the lens assembly 215 based on the specific control command. As illustrated in FIG. 10C, when the user's iris recognition is completed, additional information 513 on notification displayed on the lock screen is displayed on the display unit. (Notification viewing mode)

As described above, when the mobile terminal 100 has already received data information while the display is turned off, the data information may be more specifically displayed on the display at the same time as iris recognition. FIG. 10C illustrates a state in which chat received from the other party is shown.

Even at this time, when iris recognition is completed, the iris recognition mode may be deactivated and the camera mode may be activated. If the user horizontally swipes the detailed screen, then the mobile terminal may enter a home screen, and when the user turns off the display of the mobile terminal 100 (including an AOD state), the camera mode is deactivated and returned again to the iris recognition mode. In addition, it is seen that FIGS. 10A and 10B are in an iris recognition mode, and FIG. 10C is in a camera mode.

Meanwhile, the camera module 200 in an embodiment of the present disclosure may track the movement of the user's eyeball. In other words, the controller may analyze a region where the user is looking at with interest through eye tracking, and perceive notification desired to be checked by the user through the analysis, and display detailed content when iris authentication is carried out. Regarding this, it will be described with reference to FIG. 11.

FIG. 11A shows a state in which the display is turned off or in an AOD state as the same state as in FIG. 9A. Then, when the user turns on power, the mobile terminal enters a lock screen state as illustrated in FIG. 11B. FIG. 11B is in the same state as FIG. 9B, and for the sake of understanding, a region of interest where the user is looking at with interest is illustrated in a virtual manner. In other words, regions A, B, and C in FIG. 11B are regions in which the user's gaze stays, wherein region A is a region in which the user's gaze stays longer than region B, and region B is a region in which the user's gaze stays longer than region C. In other words, a user's region of interest is most concentrated in region A.

The user's region of interest is analyzed through eye tracking in FIG. 11B, and since the iris recognition mode is already activated, iris recognition is carried out immediately after eye tracking. When iris recognition is completed, as illustrated in FIG. 11D, information such as an application displayed in a region where the user's region of interest has been concentrated is displayed in more detail. At this time, FIG. 11C illustrates an iris recognition standby state.

FIGS. 11A through 11C illustrate a state in which the iris recognition mode is activated and the camera mode is deactivated, and FIG. 11d illustrates a state in which the camera mode is activated and the iris recognition mode is deactivated. It may be seen from the state of the notification unit 131. If the use of the mobile terminal 100 is ended, the iris recognition mode is activated and the camera mode is deactivated while returning from the state of FIG. 11D to the state of FIG. 11A.

Hereinafter, another modified embodiment will be described with reference to FIGS. 12A through 12C. FIG. 12A illustrates a gallery where a locked application, more specifically, already photographed pictures, is stored. When a password is set in a folder in the gallery, the iris recognition mode is activated and the camera mode is deactivated when an attempt is made to enter a locked folder by a method of flicking or the like. It is illustrated in FIG. 12B, and when the user is recognized as an already registered user by iris recognition, it becomes a state in which the user is able to freely view photo files in other folders.

The mobile terminal enters the iris authentication mode when locked photo file view is executed, and the user is able to view locked files when user authentication through iris is completed, and then the mobile terminal returns to the camera mode.

FIGS. 12A through 12C illustrate a case where a locked photo is viewed, but the present disclosure is not limited thereto, and the iris recognition mode may be activated in the same manner, and the camera mode is deactivated even when user authentication is required. Although not shown in detail, various embodiments may also be used in addition to the embodiments described above.

For an example, there is a case where the iris recognition mode and the camera mode may be switched when the camera is immediately executed without passing through iris recognition in a locked state. More specifically, when power is supplied while the display of the mobile terminal 100 is turned off, it becomes a locked state in which the lock screen is displayed. In the locked state, the mobile terminal may immediately enter the camera mode without performing iris recognition, and in this case, the camera mode is operated in the locked state. The camera mode at this time denotes a camera mode that is captured by the front camera 121a. An image captured by the front camera 121a is displayed on the display, and at this time the entire face and objects in the vicinity are displayed. At this time, when the user's face displayed on the display is further zoomed in, the camera mode may be switched to the iris recognition mode. When iris recognition is completed and the user is authenticated as a pre-registered user, the mobile terminal may return to the camera mode.

For another modified example, the mobile terminal may be switched to the iris recognition mode when an eye region is selected during camera capture by the front camera 121a, and a switch button indicating switching to the iris recognition mode may be generated on the display when the user's eye region is recognized. Then, when iris authentication is completed, lock is released, and the iris recognition mode may be changed to the camera mode.

For still another modified example, when the mobile terminal 100 is lifted, guide for iris recognition may be displayed on the display and guided to a state for iris recognition. In particular, when the mobile terminal 100 is provided with a camera module for wide angle capture, guide for iris recognition displayed on the display may be displayed. The user may perform iris authentication by moving the mobile terminal 100 or moving the user's gaze according to the guide. Then, when iris authentication is carried out, it may move to a home screen.

For the last modified example, the iris recognition mode may be activated when power is turned on while the display is turned off, and the camera mode may be activated when a distance between the user and the mobile terminal 100 is increased. In other words, the iris recognition mode may be activated when the power button is pressed, and iris may be automatically recognized to release lock when the user's eye is located close to the camera module 200, and the camera mode may be activated when the user's eye is located far away from the camera module 200. At this time, when the power button is merely pressed while the display is turned off, the mobile terminal may enter a self-capture mode while at the same time performing iris recognition.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the electronic device. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

The present disclosure provides a mobile terminal for capturing an image or performing an iris recognition function using a single camera module and two filters. Therefore, the present disclosure may be used in various industrial fields related thereto.

What is claimed is:

1. A mobile terminal, comprising:
a terminal body; and
a camera module provided in the terminal body,
wherein the camera module comprises:
a lens assembly;
an image sensor provided at a lower end of the lens assembly;
a first actuator mounted with a first filter and a second filter provided on one side of the lens assembly to filter light incident on the image sensor, wherein the first actuator comprises first and second support walls, and a first plate supported by the first and second support walls and supporting the first and second filters;
a filter change device configured to move the first filter to overlap with the lens assembly in a first state and to move the second filter to overlap with the lens assembly in a second state; and
a cover constituting an appearance of the camera module and including a through hole corresponding to an optical axis of the camera module, the cover having an inner space accommodating the lens assembly and the first actuator.

2. The mobile terminal of claim 1, wherein a width of each of the first and second support walls is larger than a width of the first plate, and
wherein the first actuator comprises first and second steps due to a difference between the width of each of the first and second support walls and the width of the first plate.

3. The mobile terminal of claim 2, further comprising:
a second actuator configured to adjust a focus of the lens assembly,
wherein the second actuator comprises an accommodation unit accommodating the lens assembly, and an opening hole formed in an optical axis direction to expose part of the lens assembly,
wherein the accommodation unit comprises first and second protruding portions protruded to support the first plate, and formed adjacent to the first and second support walls of the first actuator, and
wherein an outer surface of the accommodation unit comprises a step portion faulted by the first and second protruding portions, and extended to the first and second steps of the first actuator.

4. The mobile terminal of claim 3, wherein the inner space of the cover comprises a first region accommodating the first and second support walls and a portion of the second actuator, and a second region accommodating the first plate with the first and second filters and the first and second protruding portions of the accommodation unit, and
wherein the second region is formed smaller than the first region.

5. The mobile terminal of claim 3, wherein the cover comprises a depressed portion seated on the step portion of the second actuator and the first and second steps of the first actuator.

6. The mobile terminal of claim 1, wherein the first actuator further comprises:
a first filter unit comprising a second plate supporting the first filter, a first shaft, and a first guide groove and a first guide protrusion for guiding the second plate to rotate with respect to the first shaft; and
a second filter unit comprising a third plate supporting the second filter, a second shaft, a second guide groove and a second guide protrusion for guiding the third plate to rotate with respect to the second shaft.

7. The mobile terminal of claim 1, wherein the first filter is formed at one end portion of a first link rotating about a first rotation shaft,
wherein the second filter is formed at one end portion of a second link rotating about a second rotation shaft, wherein the filter change device comprises:
a first coil surrounding the first rotation shaft;
a first magnet configured to generate a first electromagnetic force by an interaction with the first coil;
a second coil surrounding the second rotation shaft; and
a second magnet configured to generate a second electromagnetic force by an interaction with the second coil, and
wherein the first filter or the second filter is selectively located on the optical axis to overlap with the lens assembly by the first and second electromagnetic forces.

8. The mobile terminal of claim 7, wherein the first and second rotation shafts are formed at a same position or integrally formed, the first coil and the second coil are the same, and the first magnet and the second magnet are the same.

9. The mobile terminal of claim 1, wherein the first filter is formed at one end portion of a first link rotating about a first rotation shaft,
wherein the second filter is formed at one end portion of a second link rotating about a second rotation shaft,
wherein the filter change device comprises:
a third link coupled to one end portion of the first link and the second link;
a third coil surrounding the third link; and
a third magnet disposed around the third coil to generate a electromagnetic force by an interaction with the third coil, and
wherein the first and second links rotate in directions opposite to each other by the movement of the third link.

10. The mobile terminal of claim 9, wherein each end portion of the first link, the second link and the third link is fastened by gear coupling.

11. The mobile terminal of claim 10, wherein a first gear is formed on at least part of one end portion of the first link, and a first rack gear configured to engage with the first gear is formed at one point of the third link, and
wherein a second gear is formed on at least part of one end portion of the second link, and a second rack gear configured to engage with the second gear is formed at one point of the third link.

12. The mobile terminal of claim 1, wherein the first filter is an infrared (IR) pass filter that transmits infrared rays to the image sensor, and the second filter is an infrared cut filter (IR cut filter) provided on one side of the infrared pass filter to cut off infrared rays transmitted to the image sensor.

13. The mobile terminal of claim 12, wherein the infrared pass filter includes a focal-length reducing lens.

14. The mobile terminal of claim 12, wherein the focal-length reducing lens is a diffraction optical element (DOE) lens.

15. The mobile terminal of claim 12, wherein the infrared pass filter operates in an iris recognition mode corresponding to the first state when the infrared pass filter is located on the optical axis, and operates in a camera mode corresponding to the second state when the infrared cut filter is located on the optical axis.

16. The mobile terminal of claim 1, wherein each of the first filter and the second filter includes a torsion spring to restore the first filter and the second filter to a preset state when power supply is cut off.

17. A mobile terminal, comprising:
a display unit;
a terminal body; and
a camera module provided in the terminal body,
wherein the camera module comprises:
a lens assembly;
an image sensor provided at a lower end of the lens assembly;
a first actuator mounted with a first filter and a second filter provided on one side of the lens assembly to filter light incident on the image sensor;
a filter change device configured to move the first filter or the second filter to selectively overlap with the lens assembly; and
a controller configured to control the first actuator to change positions of the first filter and the second filter so the first filter overlaps the lens assembly in an iris recognition mode and the second filter overlaps the lens assembly in a camera mode based on a specific control command.

18. The mobile terminal of claim 17, wherein the controller activates the iris recognition mode in a locked state to move the position of the first filter to be placed on the optical axis, and
wherein the controller compares an acquired iris image with a pre-stored iris image to perform an authentication function.

19. The mobile terminal of claim 18, wherein the controller displays a lock screen on the display unit in the locked state,
wherein the display unit releases the locked state and changes the lock screen to a home screen page when the authentication function is performed, and
wherein the controller switches the iris recognition mode to the camera mode when the locked state is released.

20. The mobile terminal of claim 18, wherein the controller displays a lock screen on the display unit that includes a notification image of an event received in the locked state and displays additional information on the display unit corresponding to the notification image when the authentication function is performed.

* * * * *